United States Patent [19]

Ozaki et al.

[11] Patent Number: 4,687,433

[45] Date of Patent: Aug. 18, 1987

[54] DIE FOR EXTRUDING CERAMIC HONEYCOMB STRUCTURAL BODIES

[75] Inventors: Sei Ozaki, Aichi; Shoji Futamura, Kawasaki; Masaru Kojima, Nagoya; Satoru Inoue, Aichi, all of Japan

[73] Assignees: NGK Insulators, Ltd.; Institute of Technology Precision Electrical Discharge Works, both of Japan

[21] Appl. No.: 832,438

[22] Filed: Feb. 24, 1986

[30] Foreign Application Priority Data

Mar. 28, 1985 [JP] Japan .................................. 60-62074

[51] Int. Cl.[4] .............................................. B29C 47/12

[52] U.S. Cl. .............................. 425/464; 264/177.12; 425/467

[58] Field of Search .................... 428/116; 264/177 R, 264/211.11, 177.1, 177.11, 177.12, 177.16; 76/107 R, 107 S; 425/168, 192 R, 192 S, 197, 198, 376 R, 380, 376 A, 382 R, 382.2, 382 N, 461-467

[56] References Cited

U.S. PATENT DOCUMENTS

| | | | |
|---|---|---|---|
| 1,874,503 | 8/1932 | Greenwood | 425/463 |
| 3,038,420 | 6/1962 | Immohr | 425/DIG. 230 |
| 3,859,031 | 1/1975 | Hawkins | 425/461 |
| 3,905,743 | 9/1975 | Bagley | 425/464 |
| 4,139,144 | 2/1979 | Cunningham | 425/192 R |
| 4,235,583 | 11/1980 | Reed | 425/464 |
| 4,343,604 | 8/1982 | Minjolle | 425/467 |
| 4,550,005 | 10/1985 | Kato | 425/380 |

FOREIGN PATENT DOCUMENTS

| | | | |
|---|---|---|---|
| 789983 | 7/1968 | Canada | 425/467 |
| 0017686 | 10/1980 | European Pat. Off. . | |
| 129367 | 12/1984 | European Pat. Off. | 425/461 |
| 1139826 | 1/1969 | United Kingdom . | |
| 1189404 | 4/1970 | United Kingdom . | |

*Primary Examiner*—Jay H. Woo

*Assistant Examiner*—J. Fortenberry

*Attorney, Agent, or Firm*—Parkhurst & Oliff

[57] ABSTRACT

A die for extruding honeycomb structural bodies includes a plurality of ceramic batch exhaust grooves and a plurality of ceramic batch supply apertures. Tubes are fitted in at least some of the ceramic batch supply apertures to improve or make constant the surface roughness and dimensions of inner surfaces of ceramic batch supply apertures through which the ceramic batch passes, thereby producing perfect ceramic honeycomb stuctural bodies. The adjustment of flow of ceramic batch is so simplified that any other controlling plate which would be required in the prior art is not needed for controlling the flow. When the supply apertures have been worn off, the tubes are exchanged by new ones to restore the required inner surfaces easily.

14 Claims, 8 Drawing Figures

DIE FOR EXTRUDING CERAMIC HONEYCOMB STRUCTURAL BODIES

BACKGROUND OF THE INVENTION

This invention relates to an extruding die for producing ceramic honeycomb structural bodies, and more particularly to ceramic batch supply apertures of an extruding die for extruding ceramic honeycomb structural bodies.

Ceramic honeycomb structural bodies are effective as catalyst carriers for purifying exhaust gases of internal combustion engines, or are effective as filters for filtering fine particles and the like. These honeycomb structural bodies are usually made of a ceramic material such as cordierite, alumina, silicon carbide and the like, and owing to their configurations, they are generally produced by an extruding method.

An extruding die for use in the extruding method has been known and is disclosed in U.S. Pat. No. 3,905,743, wherein the die is formed on one side with ceramic batch supply apertures 41 for supplying a ceramic batch by means of an extruding molding machine and on the other side with ceramic batch exhaust grooves 42 corresponding in sectional shape to a ceramic honeycomb structure body to be extruded, as shown in FIG. 1. Another extruding die has been known and is disclosed in Japanese Laid-open Patent Application No. 58-217,308, wherein ceramic batch reservoirs 43 are provided between ceramic batch supply apertures 41 and ceramic batch exhaust grooves 42 as shown in a partial perspective view of FIG. 2.

In order to particularly define or control the flow of ceramic batch to obtain perfect ceramic honeycomb structural bodies, it has been proposed to provide a perforated plate (Japanese Patent Application Publication No. 53,844/84) or a flow rectifier plate (Japanese Patent Application Publication No. 46,763/84) on a ceramic batch supplying side of a die.

These ceramic batch supply apertures in extruding dies are formed by drilling holes with drills made of hard metals such as die steels. When the supply apertures are considerably long in comparison with diameters thereof, dimensional accuracy of the supply apertures on a side of the exhaust grooves becomes lower. Moreover, irregularities in roughness of inner surfaces of the supply apertures become large because of the multiplicity of the apertures. As a result, flow of the ceramic batch passing through the supply apertures becomes uneven, so that perfect ceramic honeycomb structural bodies cannot be produced. This is particularly acute in ceramic batch supply apertures having very small diameters which would obtain honeycomb structure bodies having cells with a high density.

In order to solve these problems, ceramic batch supply apertures have been finished by honing in manufacturing extruding dies to improve the surface roughness. As an alternative, a die is separated into two parts which are jointed together after working. These methods are not acceptable from an economical viewpoint.

The methods of particularly defining the flow of ceramic batch using the perforated plate or flow rectifier plate as above described, permit the control of the flow just before the ceramic batch supply apertures, but do not define the flow by the supply apertures, themselves. Accordingly, such methods are insufficient to directly adjust irregularities in individual resistance of the flow in the supply and exhaust apertures. In extruding honeycomb structural bodies having cells distributed with different densities, therefore, these methods of the prior art encounter great difficulties.

SUMMARY OF THE INVENTION

It is a primary object of the invention to provide an improved die for extruding ceramic honeycomb structural bodies, which eliminates all the disadvantages of the prior art and which includes uniform ceramic batch supply apertures by the use of a simple means without requiring particular working means.

It is another object of the invention to provide a die for extruding ceramic honeycomb structural bodies capable of securely defining or controlling the flow of a ceramic batch.

In order to achieve these objects, according to the invention the die for extruding honeycomb structural bodies including a plurality of ceramic batch exhaust grooves and a plurality of ceramic batch supply apertures, comprises tubes which are fitted into at least part of said ceramic batch supply apertures.

Inner diameters of the tubes fitted in the ceramic batch supply apertures are different in a central region than in an outer circumferential region of the die.

In a preferred embodiment, the tubes are fitted only into the supply apertures in an outer circumferential region of the die.

In another embodiment, the tubes extend from a surface of the die on a ceramic batch supplying side.

According to the invention, tubes having required shapes and inner diameters are inserted into at least part of ceramic batch supply apertures previously formed in an extruding die to improve roughness of inner surfaces on which ceramic batch passes and to make constant the inner diameters of the apertures to facilitate the manufacturing of the die.

Arranging the tubes in the supply apertures is performed only by inserting the tubes into the apertures, because the tubes are urged by the ceramic batch toward the exhaust grooves, so that there is no risk of the tubes becoming dislodged from the die. The tubes may of course be fixed to the die by brazing or the like.

The tubes may be made of a metal such as stainless steel, nickel or chromium steel, steel coated with nickel, chromium, Teflon or the like, copper alloy, cemented carbide as tungsten carbide or the like, ceramic materials such as alumina and plastic material or the like. The selection of these materials is determined according to factors of material of ceramic honeycomb structural bodies to be produced, ceramic batch, extruding pressure, resistance distribution of the ceramic batch and the like. In general, wear-resistance properties and the coefficient of friction of the ceramic batch are considered in determining the material comprising the tubes.

In order that the invention may be more clearly understood, preferred embodiments will be described, by way of example, with reference to the accompanying drawings.

DESCRIPTION OF THE PREFERRED EMBODIMENTS

Figure 1:
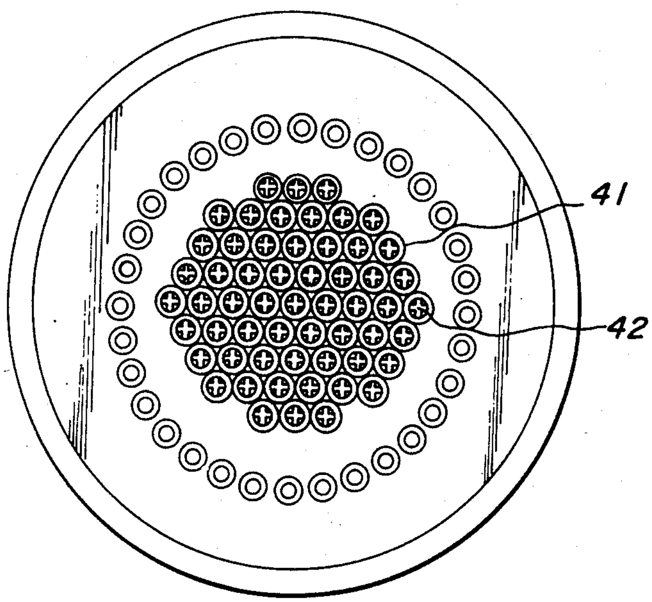
FIG 1 PRIOR ART
FIG. 1 is a front elevation of an extruding die for honeycomb structural bodies of the prior art.
Figure 2:
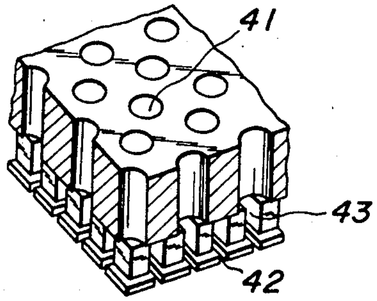
FIG 2 PRIOR ART
FIG. 2 is a partial sectional perspective view of an extruding die for honeycomb structural bodies of the prior art.
Figure 3A:
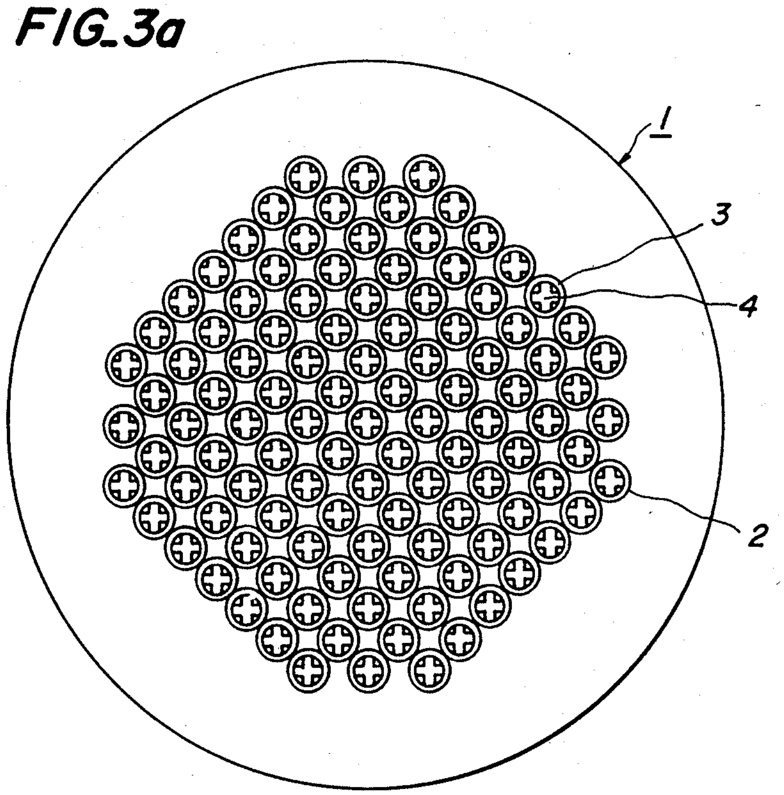
FIG. 3*a* is a front elevation of an extruding die of one embodiment of the invention.
Figure 3B:
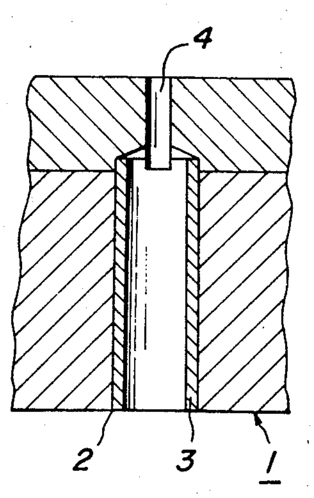
FIG. 3*b* is a partial sectional view of the die shown in FIG. 3*a;*

FIG. 3*a* is a front elevation of one embodiment of an extruding die according to the invention, as viewed from a ceramic batch supplying side and FIG. 3*b* is a sectional view of the proximity of one ceramic batch supply aperture of the die. In this embodiment, inner diameters of all the ceramic batch supply apertures 2 are substantially equal and tubes 3 whose outer diameters are substantially equal to the inner diameters of the supply apertures 2 are fitted into all of the supply apertures 2. The tube 3 extends from a surface of the die 1 to an exhaust groove 4 which is in the form of a slit. In general, the tube has a diameter of 1.0–5.0 mm and a thickness of 0.05–0.2 mm. These dimensions, however, may be selected according to products to be extruded.

Figure 4:
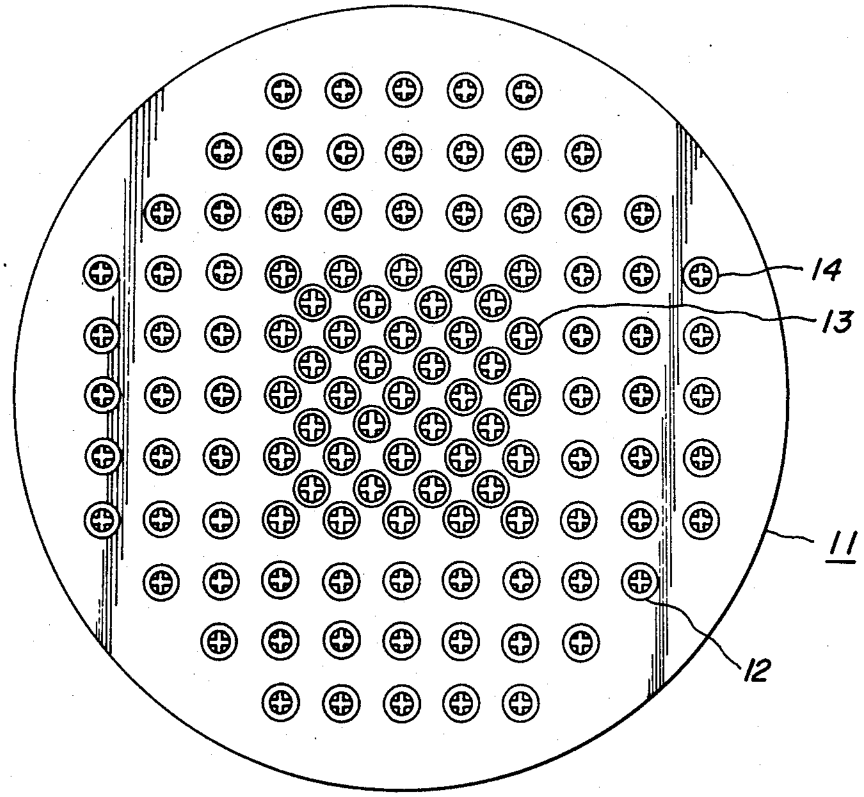
FIG. 4 is a front elevation of a die of another embodiment of the invention viewed from a ceramic batch supply side.
Figure 5:
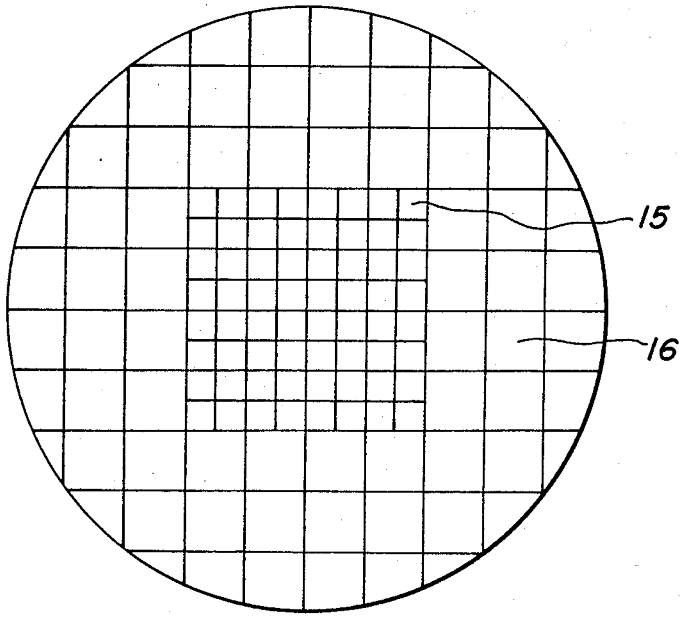
FIG. 5 is a schematic front view of a honeycomb structural body produced by the die shown in FIG. 4.

FIG. 4 is a front elevation illustrating an extruding die of another embodiment of the invention as viewed from a ceramic batch supplying side. In this embodiment, all tubes 13 and 14 have outer diameters substantially equal to inner diameters of ceramic batch supply apertures, but inner diameters of the tubes 13 are different from those of the tubes 14. The tubes 13, having the larger inner diameters, are located in ceramic batch supply apertures 12 in a central region of the die 11, while the tubes 14, having the smaller inner diameters, are located in apertures 12 in an outer circumferential region of the die 11. Such an extruding die is effective for extruding ceramic honeycomb structural bodies whose shapes are as shown in FIG. 5. In other words, this die is effective for a honeycomb structural body whose cells are arranged at a center with a higher density than that at an outer circumference of the honeycomb structural body which is preferably used in cases where exhaust gases are concentrated at a central region of a catalyst carrier for purifying exhaust gases of an internal combustion engine. Moreover, such an extruding die is used to particularly control the flow of a ceramic batch in order to obtain a ceramic honeycomb structural body having uniformly distributed cells.

The arrangement of the tubes 13 and 14 is not limited to that shown in FIG. 4. It may be determined according to shapes of cells of required ceramic honeycomb structural bodies and distributions of flow of the ceramic batch to be controlled.

Figure 6:
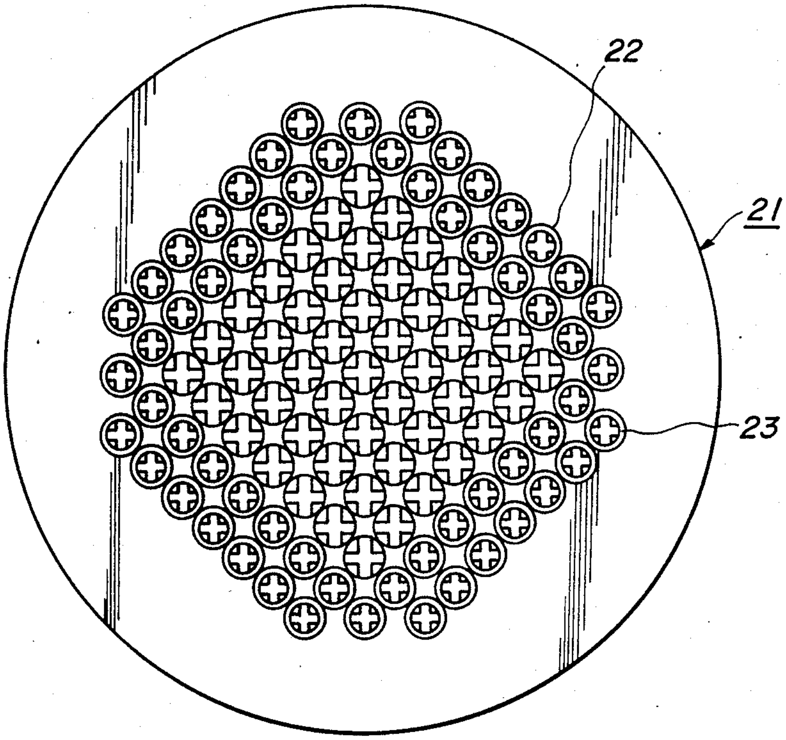
FIG. 6 is a front view of a die of a further embodiment of the invention viewed from a ceramic batch supply side.

FIG. 6 is a front elevation of an extruding die of a further embodiment of the invention viewed on a side supplying ceramic batch. In this embodiment, tubes 23 having substantially equal outer diameters are arranged only in ceramic batch supply apertures 22, having substantially equal inner diameters, in an outer region of the die. The inner diameters of the tubes 23 are not limited to equal diameters as they may be different, as shown in FIG. 4.

The extruding die 21, thus constructed, is preferably used in the case of controlling the flow of a ceramic batch. The ceramic batch supply apertures 22 having no tubes 23 are required to have dimensions and shapes so as not to impede the flow of a ceramic batch. In general, large inner diameters of ceramic batch supply apertures are preferable.

Figure 7:
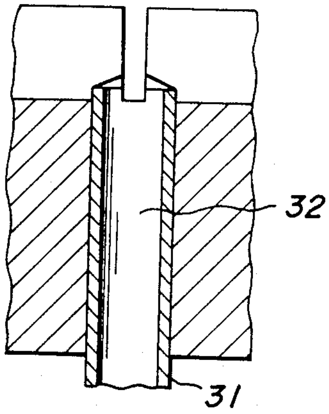
FIG. 7 is a partial sectional view illustrating a further embodiment of the invention.

FIG. 7 is a partial sectional view for explaining fitting of a tube into a ceramic batch supply aperture of a die in one embodiment of the invention. In this embodiment, a tube 31 extends from a ceramic batch supply aperture 32 beyond a surface of the die toward an extruding molding machine (not shown). The extending height and distribution of the tubes may be determined according to the shapes of cells of required ceramic honeycomb structural bodies and the distribution of the flow of ceramic batch to be controlled. For example, in order for the ceramic batch, which forms a center portion of a ceramic honeycomb structural body, to flow slower than the ceramic batch that forms an outer portion of the structural body, the height of the tubes extending beyond the surface of the die may be increased.

In order to adjust the flow of ceramic batch by tubes of the die according to the invention, such an adjustment can be performed by making the tubes of materials having different coefficients of friction and arranging them in a particular manner. For example, if it is required to flow the ceramic batch at the center of a die slower than that in an outer portion of the die, the tubes at the central region of a die are made of a material having a coefficient of friction which is greater than that of a material of the tubes in an outer circumferential region of the die.

Although the ceramic batch supply apertures having equal inner diameters have been explained in the above embodiments, the inner diameters of the apertures may be different from each other. However, this invention is particularly effective for dies where all the inner diameters of ceramic batch supply apertures are substantially equal, because the essential features lie in controlling the flow of the ceramic batch by particular dimensions and arrangement of the tubes.

As can be seen from the above description, the extruding die according to the invention permits a ceramic batch to flow uniformly to obtain perfect ceramic honeycomb structures bodies, because without using any particular working means it is feasible to make constant the surface roughness and dimensions of inner surfaces of ceramic batch supply apertures through which the ceramic batch passes. Moreover, the adjustment of the flow of the ceramic batch is so simplified that another extruding die is not needed for controlling the flow. Furthermore, when inner surfaces of the ceramic batch supply apertures have been worn off by the ceramic batch, the inner surfaces can be easily restored by changing tubes arranged in the apertures.

It is further understood by those skilled in the art that the foregoing description is that of preferred embodiments of the disclosed structures and that various changes and modifications may be made in the invention without departing from the spirit and scope of the following claims.

What is claimed is:

1. A die for extruding a ceramic batch for forming ceramic honeycomb structural bodies, comprising:

a plurality of ceramic batch exhaust grooves;

a plurality of ceramic batch supply apertures; and a plurality of tubes fitted into at least some of said plurality of ceramic batch supply apertures, said supply apertures individually forming passages in said die and said supply apertures collectively with said plurality of tubes forming passages in said die, said passages controlling a flow resistance of the ceramic batch passing through said passages by resulting in a different flow resistance in at least two of said passages.

2. A die for extruding ceramic honeycomb structural bodies as set forth in the claim 1, wherein inner diameters of said plurality of tubes fitted into the ceramic batch supply apertures are different in a central region of said die from inner diameters of tubes located in an outer circumferential region of the die.

3. A die for extruding ceramic honeycomb structural bodies as set forth in claim 1, wherein said tubes are fitted only into said plurality of supply apertures which are located in an outer circumferential region of the die.

4. A die for extruding ceramic honeycomb structural bodies as set forth in claim 1, wherein said plurality of tubes extend from a surface of the die on a ceramic batch supply side of the die.

5. A die for extruding ceramic honeycomb structural bodies as set forth in claim 1, wherein at least two of said plurality of tubes are made of different materials.

6. A die for extruding ceramic honeycomb structural bodies as set forth in claim 1, wherein at least two of said plurality of tubes are made of a material having different coefficients of friction.

7. A die for extruding ceramic honeycomb structural bodies as set forth in claim 1, wherein at least two of said plurality of tubes have a different longitudinal length, said different longitudinal lengths controlling the flow resistance of the ceramic batch passing through said plurality of tubes.

8. A die for extruding a ceramic batch for forming ceramic honeycomb structural body, comprising:

a plurality of ceramic batch exhaust grooves;

a plurality of ceramic batch supply apertures, each of said apertures having an inner diameter; and a plurality of tubes having outer diameters, said plurality of tubes being fitted into at least some of said plurality of ceramic batch apertures, said inner diameter of said plurality of ceramic batch supply apertures and said outer diameter of said plurality of tubes being substantially equal, said supply apertures individually forming passages in said die and said supply apertures collectively with said plurality of tubes forming passages in said die, said passages controlling a flow resistance of the ceramic batch passing through said passages by resulting in a different flow resistance in at least two of said passages, thereby permitting a uniform extrusion of said ceramic honeycomb structural body.

9. A die for extruding ceramic honeycomb structural bodies as set forth in the claim 8, wherein inner diameters of said plurality of tubes fitted into the ceramic batch supply apertures are different in a central region of said die from inner diameters of tubes located in an outer circumferential region of the die.

10. A die for extruding ceramic honeycomb structural bodies as set forth in claim 8, wherein said tubes are fitted only into said plurality of supply apertures which are located in an outer circumferential region of the die.

11. A die for extruding ceramic honeycomb structural bodies as set forth in claim 8, wherein said plurality of tubes extend from a surface of the die on a ceramic batch supply side of the die.

12. A die for extruding ceramic honeycomb structural bodies as set forth in claim 8, wherein at least two of said plurality of tubes are made of different materials.

13. A die for extruding ceramic honeycomb structural bodies as set forth in claim 8, wherein at least two of said plurality of tubes are made of a material having different coefficients of friction.

14. A die for extruding ceramic honeycomb structural bodies as set forth in claim 8, wherein at least two of said plurality of tubes have a different longitudinal length, said different longitudinal lengths controlling the flow resistance of the ceramic batch passing through said plurality of tubes.

* * * * *